(12) United States Patent
Ngo et al.

(10) Patent No.: US 8,031,691 B2
(45) Date of Patent: *Oct. 4, 2011

(54) SYSTEM AND METHOD FOR WIRELESS COMMUNICATION OF UNCOMPRESSED VIDEO HAVING ACKNOWLEDGMENT (ACK) FRAMES

(75) Inventors: Chiu Ngo, San Francisco, CA (US); Harkirat Singh, Santa Clara, CA (US); Huai-Rong Shao, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 846 days.

This patent is subject to a terminal disclaimer.

(21) Appl. No.: 11/726,084

(22) Filed: Mar. 20, 2007

(65) Prior Publication Data

US 2008/0037466 A1    Feb. 14, 2008

Related U.S. Application Data

(60) Provisional application No. 60/836,903, filed on Aug. 9, 2006.

(51) Int. Cl.
*H04J 3/24* (2006.01)
(52) U.S. Cl. ........ 370/349; 370/329; 370/334; 370/339; 370/389; 370/230; 709/236
(58) Field of Classification Search .................. 370/329, 370/339, 334, 389, 349, 230–237; 709/236
See application file for complete search history.

(56) References Cited

U.S. PATENT DOCUMENTS

| 5,224,105 | A | * | 6/1993 | Higley | 714/748 |
|---|---|---|---|---|---|
| 5,636,251 | A | | 6/1997 | Citta et al. | |
| 7,020,121 | B2 | | 3/2006 | Hardacker et al. | |
| 7,039,068 | B1 | * | 5/2006 | Halasz | 370/473 |
| 7,073,079 | B1 | | 7/2006 | Karsi et al. | |
| 7,304,975 | B2 | * | 12/2007 | Shvodian | 370/338 |
| 2002/0002708 | A1 | * | 1/2002 | Arye | 725/95 |
| 2002/0164968 | A1 | | 11/2002 | Crawford | |

(Continued)

FOREIGN PATENT DOCUMENTS

JP    2004-064271    2/2004

OTHER PUBLICATIONS

Distributed Medium Access Control (MAC) for wireless networks, WiMedia Alliance, Draft 0.99, Nov. 1, 2005.

(Continued)

*Primary Examiner* — Jinsong Hu
*Assistant Examiner* — Qun Shen
(74) *Attorney, Agent, or Firm* — Kenneth L. Sherman, Esq.; Michael Zarrabian, Esq.; Myers Andras Sherman & Zarrabian LLP

(57) ABSTRACT

A system and method for wireless communication of uncompressed video data are disclosed. One embodiment of the system includes a wireless communication device. The device includes a receiver configured to receive a data packet, and a transmitter configured to send an acknowledgment (ACK) signal upon receiving a data packet. The ACK signal includes a physical layer preamble, a physical layer header including a plurality of bits indicative of the status of the data packet, and a cyclic redundancy check (CRC) field. The ACK signal optionally includes a payload field containing beam-tracking data.

32 Claims, 10 Drawing Sheets

U.S. PATENT DOCUMENTS

| | | | | |
|---|---|---|---|---|
| 2002/0181492 | A1* | 12/2002 | Kasami et al. | 370/445 |
| 2003/0039226 | A1 | 2/2003 | Kwak | |
| 2003/0179707 | A1* | 9/2003 | Bare | 370/235 |
| 2003/0214930 | A1 | 11/2003 | Fischer | |
| 2004/0156354 | A1 | 8/2004 | Wang et al. | |
| 2004/0258092 | A1 | 12/2004 | Sugaya | |
| 2005/0111451 | A1* | 5/2005 | Kim | 370/389 |
| 2005/0136990 | A1 | 6/2005 | Hardacker et al. | |
| 2005/0165950 | A1* | 7/2005 | Takagi et al. | 709/236 |
| 2005/0195858 | A1* | 9/2005 | Nishibayashi et al. | 370/474 |
| 2005/0265297 | A1 | 12/2005 | Nakajima et al. | |
| 2005/0285803 | A1 | 12/2005 | Iacono et al. | |
| 2006/0034317 | A1* | 2/2006 | Hong et al. | 370/445 |
| 2006/0056300 | A1* | 3/2006 | Tamura et al. | 370/235 |
| 2006/0056345 | A1* | 3/2006 | Marinier et al. | 370/329 |
| 2006/0089144 | A1 | 4/2006 | Kim et al. | |
| 2006/0109813 | A1* | 5/2006 | Saito et al. | 370/329 |
| 2006/0111129 | A1* | 5/2006 | Ihm et al. | 455/466 |
| 2006/0229075 | A1 | 10/2006 | Kim et al. | |
| 2007/0234170 | A1 | 10/2007 | Shao et al. | |
| 2007/0286103 | A1 | 12/2007 | Niu et al. | |
| 2007/0288980 | A1 | 12/2007 | Niu et al. | |
| 2008/0002650 | A1 | 1/2008 | Xia et al. | |
| 2008/0037465 | A1 | 2/2008 | Ngo et al. | |
| 2008/0045149 | A1 | 2/2008 | Dharmaraju et al. | |
| 2008/0056393 | A1 | 3/2008 | Niu et al. | |

OTHER PUBLICATIONS

High-Definition Multimedia Interface (HDMI) Specifications version 1.2, Aug. 22, 2005.

IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003.

Maruhashi et al., "Wireless uncompressed-HDTV-signal transmission system utilizing compact 60-GHz-band transmitter and receiver," Microwave Symposium Digest, 2005 IEEE MTT-S International, Jun. 12-17, 2005.

Hachman, "CE Giants back Amimon's Wireless HDTV Tech," PCMAG.com, 1 page (Jul. 23, 2008).

"NEC develops compact millimeter-wave transceiver for uncompressed HDTV signal transmission," *NE Asia Online*, Apr. 5, 2005, (Downloaded from htto://neasia.nikkeibp.com/topstory/000913 on Sep. 29, 2006.).

WirelessHD Specification Version 1.0 Overview, Oct. 9, 2007, 77 pages.

FreshNews.com, SiBEAM Receives Equity Investment from Best Buy, http://freshnews.com/print/node/261440, Jan. 4, 2010, 2 pages.

IEEE P802.11n™ /D1.0, "Draft Amendment to STANDARD [FOR] Information Technology-Telecommunications and information exchange between systems—Local and Metropolitan networks—Specific requrements—Part 11: Wireless LAN Medium Access Control (MAC) and Physical Layer (PHY) specifications: Enhancements for Higher Throughput," IEEE , Mar. 2006.

Kim, "FEC and Data Reordering," WiHD Osaka Conference, Apr. 25, 2006.

Van Veen et al., Beamforming: A Versatile Approach to Spatial Filtering, IEEE ASSP Magazine, Apr. 1988, 5: 4-24.

International Preliminary Report on Patentability and Written Opinion dated Feb. 10, 2009 for PCT/KR2007/003347, filed Jul. 10, 2007.

International Search Report dated Oct. 17, 2007 from PCT/KR2007/003347, filed Jul. 10, 2007.

U. S. Office Action dated Oct. 30, 2009 in U.S. Appl. No. 11/726,056, filed Mar. 20, 2007.

U.S. Office Action dated Jan. 6, 2010 in U.S. Appl. No. 11/724,856, filed Mar. 16, 2007.

European Supplemental Search Report dated Mar. 19, 2010 in European Application No. 07768682.2.

IEEE Std 802.15.3—IEEE Standard for Information Technology—Telecommunications and information exchange between systems—Local and metropolitan area networks—Specific Requirement.s Part 15.3: Wireless Medium Access Control (MAC) and Physical Layer PHY) Specifications for High Rate Wireless Personal Area Networks (WPANs), pp. 111-113, Sep. 29, 2003.

MBOA and WiMedia Alliance—Distributed Medium Access Control (MAC) for Wireless Networks, Draft 0.99, p. 78, Nov. 1, 2005.

IEEE Std 802.11—IEEE Standard for Information Technology—Telecommunications and information exchange between systems—Local and metropolitan area networks—Specific Requirement.s Part 11: Wireless LAN Medium Access Control (MAC) and Physical Layer (PHY) Specifications, p. 74, Jun. 12, 2007.

Gaetano, Lianne, SiBeam-60 GHz Architecture for Wireless Video Display, Mar. 2006.

Office Action date Apr. 29, 2010 in U.S. Appl. No. 11/726,056.

* cited by examiner

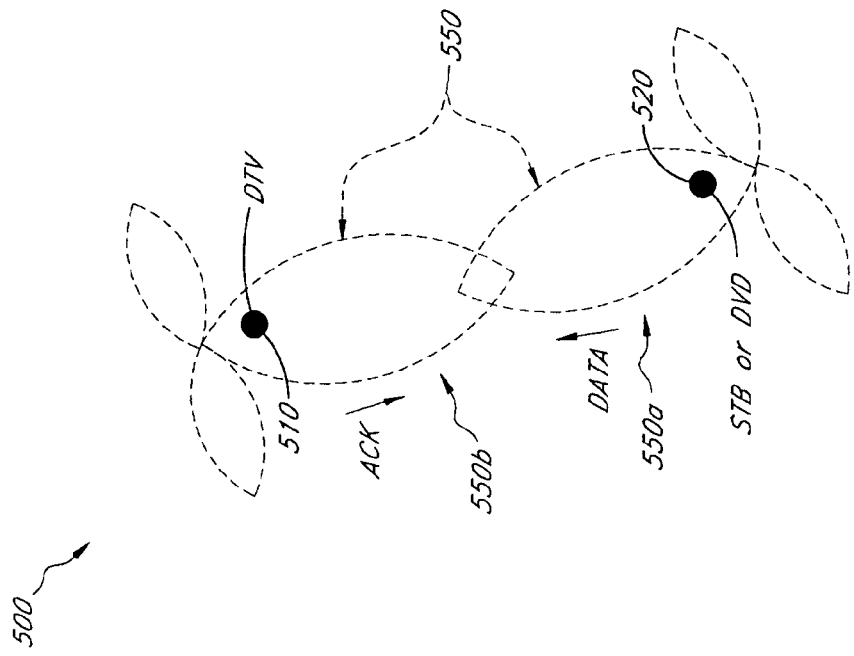
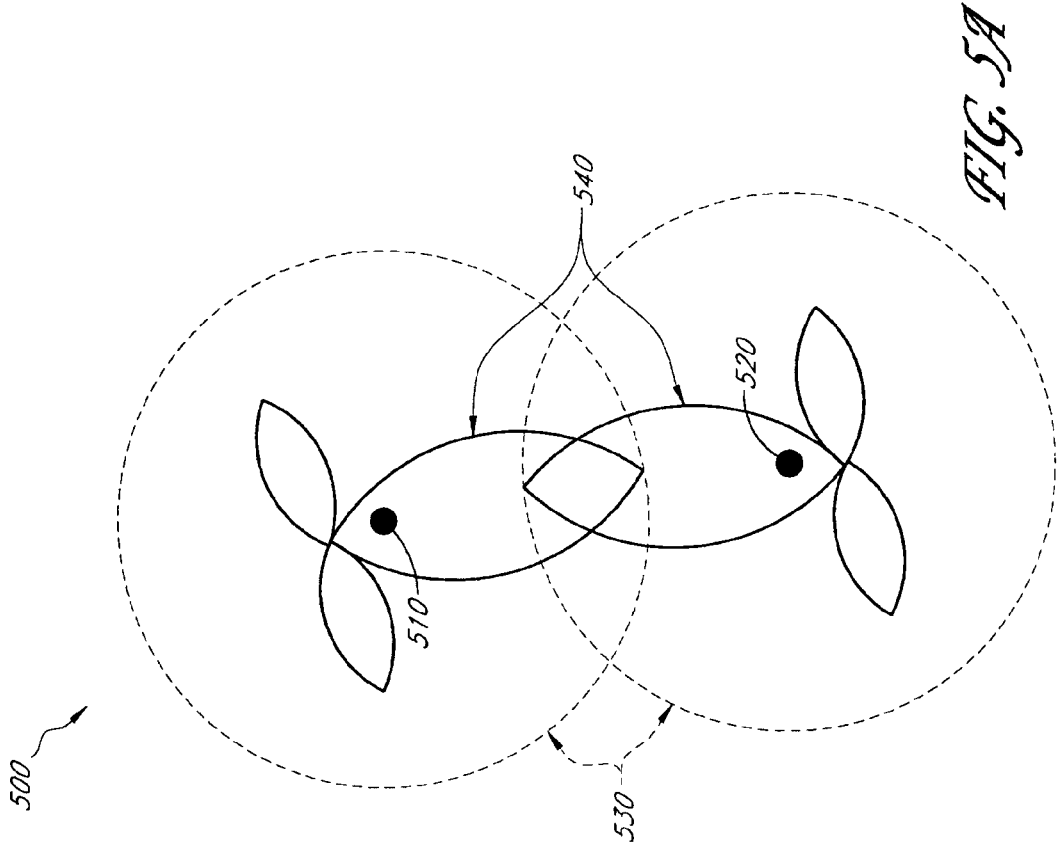

SYSTEM AND METHOD FOR WIRELESS COMMUNICATION OF UNCOMPRESSED VIDEO HAVING ACKNOWLEDGMENT (ACK) FRAMES

CROSS-REFERENCE TO RELATED APPLICATIONS

This application claims priority from U.S. Provisional Patent Application No. 60/836,903, filed on Aug. 9, 2006, the disclosure of which is incorporated herein by reference. This application is related to U.S. application Ser. No. 11/726,056, filed Mar. 20, 2007, published as U.S. Patent Application Publication No. 2008/0037465, entitled SYSTEM AND METHOD FOR WIRELESS COMMUNICATION OF UNCOMPRESSED VIDEO HAVING ACKNOWLEDGEMENT (ACK) FRAMES (Inventors: Chiu Ngo, Harkirat Singh, and Huai-Rong Shao, the disclosure of which is incorporated herein by reference.

BACKGROUND OF THE INVENTION

1. Field of the Invention

The present invention relates to wireless transmission of video information, and in particular, to transmission of uncompressed high definition video information over wireless channels.

2. Description of the Related Technology

With the proliferation of high quality video, an increasing number of electronic devices, such as consumer electronic devices, utilize high definition (HD) video which can require about 1 Gbps (Giga bits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices are connected which do not have the bandwidth to carry the uncompressed HD signals.

Transfer of uncompressed video signals requires more use of wireless channels than that of compressed video signals because of a higher volume of data being transferred. Thus, there is a need to provide a system and a method which allow an efficient use of wireless channels while enhancing the accuracy and quality of data being transferred.

SUMMARY OF CERTAIN INVENTIVE ASPECTS

One aspect of the invention provides a wireless communication device, comprising: a receiver configured to receive a data packet; and a transmitter configured to send an acknowledgment (ACK) signal upon receiving a data packet, the acknowledgment signal comprising: a physical layer preamble; a physical layer header including a plurality of bits indicative of the status of the data packet; and a cyclic redundancy check (CRC) field.

The acknowledgment signal may not include a media access control (MAC) header. The receiver may be configured to receive the data via a low-rate channel. The low-rate channel may be in one of a directional mode and an omni-directional mode. The receiver may be configured to receive a data packet via a high-rate channel, and the transmitter may be configured to send the acknowledgment signal via a low-rate channel. The plurality of bits may comprise at least one bit indicative of whether bits in the data packet are equally or unequally protected against transmission error. The plurality of bits may further comprise one or more bits indicative of the status of the data packet.

The transmitter may be configured to select what the one or more bits are indicative of, depending on whether the bits in the data packet are equally or unequally protected against transmission error. The data packet may comprise a plurality of data sub-packets, and the one or more bits may be indicative of the most significant bits of the data sub-packets. The one or more bits may be further indicative of the least significant bits of the data sub-packets. The transmitter may be configured to use one of a directional mode and an omni-directional mode when sending the ACK signal, and the transmitter may be further configured to select what the one or more bits are indicative of, depending on whether the transmitter uses the directional mode or the omni-directional mode.

The ACK signal may further comprise a payload field. The transmitter may be configured to use a beam for transmitting the ACK signal, and the payload field may comprise data indicative of the status of the beam. The plurality of bits may further comprise at least one bit indicative of the content of the payload field. The device may be configured to use time division duplexing (TDD). The device may be configured to use frequency division duplexing (FDD).

Another aspect of the invention provides an audiovisual device, comprising: the device described above; and electronics configured to process audiovisual data.

Yet another aspect of the invention provides a wireless communication device, comprising: means for receiving a data packet; and means for sending an acknowledgment (ACK) signal after receiving the data packet, the acknowledgment signal comprising: a physical layer preamble; a physical layer header including a plurality of bits indicative of the status of the data packet; and a cyclic redundancy check (CRC) field.

Another aspect of the invention provides a method of wireless communication for uncompressed video data, the method comprising: receiving a data packet; and sending an acknowledgment (ACK) signal after receiving the data packet, the acknowledgment signal comprising: a physical layer preamble; a physical layer header including a plurality of bits indicative of the status of the data packet; and a cyclic redundancy check (CRC) field.

Receiving the data packet may comprise using a high-rate channel, and sending the acknowledgment signal may comprise using a low-rate channel. Receiving the data packet may comprise using a low-rate channel, and sending the acknowledgment signal may comprise using the low-rate channel. The low-rate channel may be in a directional mode, and the acknowledgment signal may be a directional acknowledgment signal. The low-rate channel may be in an omni-directional mode, and the acknowledgment signal may be an omni-directional acknowledgment signal.

The plurality of bits may comprise at least one bit indicative of whether bits in the data packet are equally or unequally protected against transmission error. The plurality of bits may further comprise one or more bits indicative of the status of the data packet. Sending the ACK signal may comprise selecting what the one or more bits are indicative of, depending on whether the bits in the data packet are equally or unequally protected against transmission error. Sending the ACK signal may comprise using one of a directional mode and an omni-directional mode, and sending the ACK signal may comprise selecting what the one or more bits are indicative of, depending on whether the directional mode or the omni-directional mode is used.

The ACK signal may further comprise a payload field. The payload field may comprise beam-tracking data. The plurality of bits may further comprise at least one bit indicative of the content of the payload field.

Another aspect of the invention provides a wireless communication device, comprising: a receiver configured to receive a data packet; an antenna configured to form a beam, the antenna comprising a plurality of antenna elements; and a transmitter configured to send an acknowledgment (ACK) signal upon receiving the data packet, the ACK signal comprising a payload field comprising: a bitmap including a plurality of bits, each bit being indicative of whether the current status of one of the antenna elements is different from the immediately previous status thereof; and a data field including data indicative of the current status of the antenna elements whose current status is different from the immediately previous status thereof.

The data of the data field may comprise the beam-tracking data of the antenna elements. The transmitter may be further configured to determine the total number of the antenna elements whose current status is different from the immediately previous status thereof, and the transmitter may be further configured to selectively include the bitmap in the payload field, based on the total number.

Another aspect of the invention provides a wireless communication device, comprising: an antenna configured to form a beam, the antenna comprising a plurality of antenna elements; means for receiving a data packet via the beam; and means for sending an acknowledgment (ACK) signal via the beam upon receiving the data packet, the ACK signal comprising a payload field comprising: a bitmap including a plurality of bits, each bit being indicative of whether the current status of one of the antenna elements is different from the immediately previous status thereof; and a data field including data indicative of the current status of the antenna elements whose current status is different from the immediately previous status thereof.

Yet another aspect of the invention provides a method of wireless communication for uncompressed video data, the method comprising: forming a beam using an antenna comprising a plurality of antenna elements; receiving a data packet via the beam; providing an acknowledgment (ACK) signal having a payload field, providing the ACK signal comprising: selectively adding a bitmap to the payload field, the bitmap including a plurality of bits, each bit being indicative of whether the current status of one of the antenna elements is different from the immediately previous status thereof; and adding data to the payload field, the data being indicative of the current status of the antenna elements whose current status is different from the immediately previous status thereof; and sending the ACK signal via the beam.

The data added to the payload field may comprise the beam-tracking data of the antenna elements. Providing the ACK signal may further comprise determining the total number of the antenna elements whose current status is different from the immediately previous status thereof, and the bitmap may be selectively added to the payload field, based on the total number.

BRIEF DESCRIPTION OF THE DRAWINGS

FIG. 5A is a diagram illustrating a low rate (LR) channel for uncompressed HD video transmission, according to one embodiment.

FIG. 5B is a diagram illustrating a high rate (HR) channel for uncompressed HD video transmission and a low rate (LR) channel for acknowledgment signal transmission, according to another embodiment.

DETAILED DESCRIPTION OF CERTAIN INVENTIVE EMBODIMENTS

Figure 1:
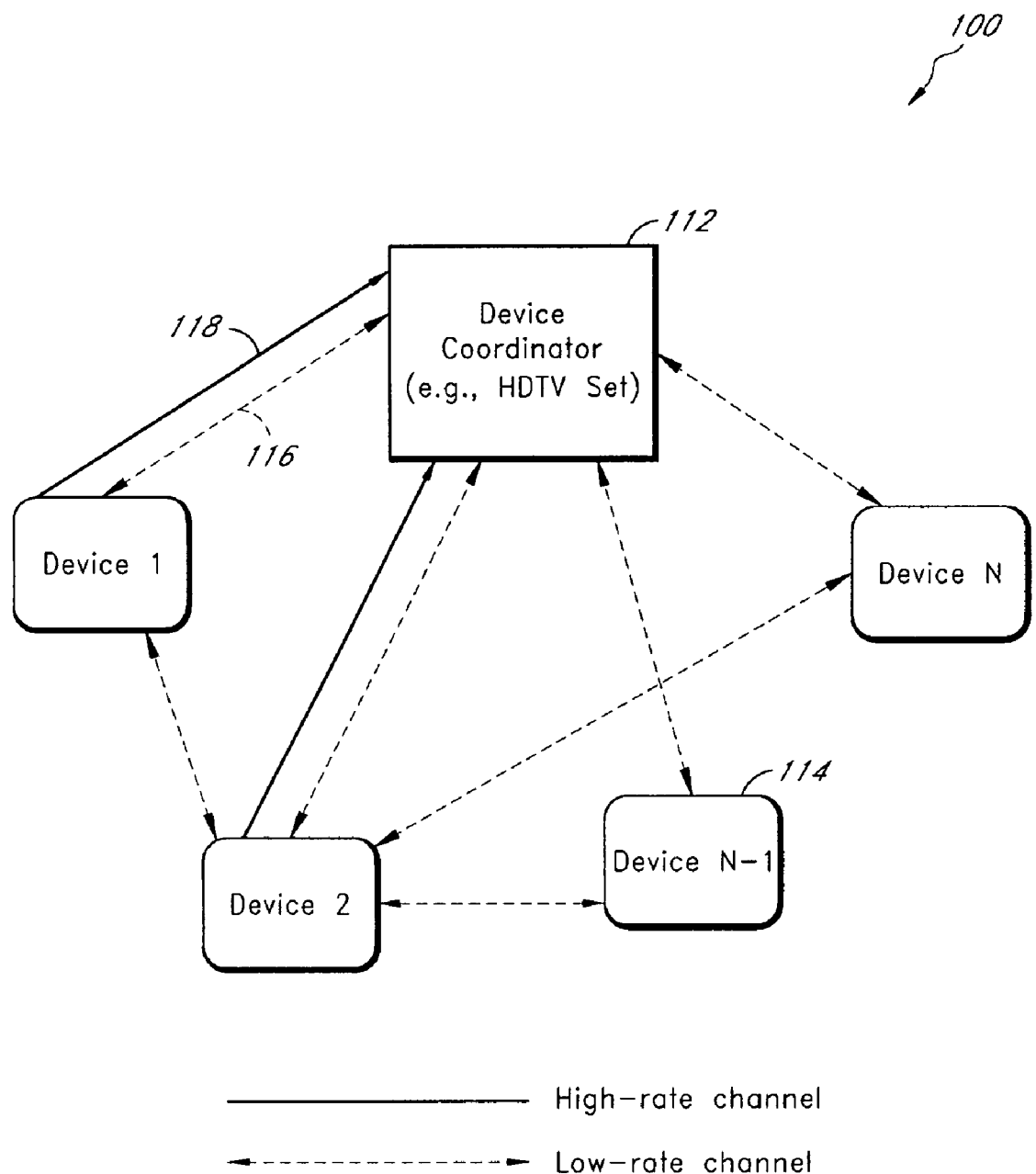
FIG. 1 is a functional block diagram of a wireless network that implements uncompressed HD video transmission between wireless devices, according to one embodiment of the system and method.

Various aspects and features of the invention will become more fully apparent from the following description and appended claims taken in conjunction with the foregoing drawings. In the drawings, like reference numerals indicate identical or functionally similar elements.

Certain embodiments provide a method and system for transmission of uncompressed HD video information from a sender to a receiver over wireless channels. Example implementations of the embodiments in a wireless high definition (HD) audio/video (A/V) system will now be described.

FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1 . . . Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-GB/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgment (ACK) frames. For example, the low-rate channel 116 can transmit an acknowledgment from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
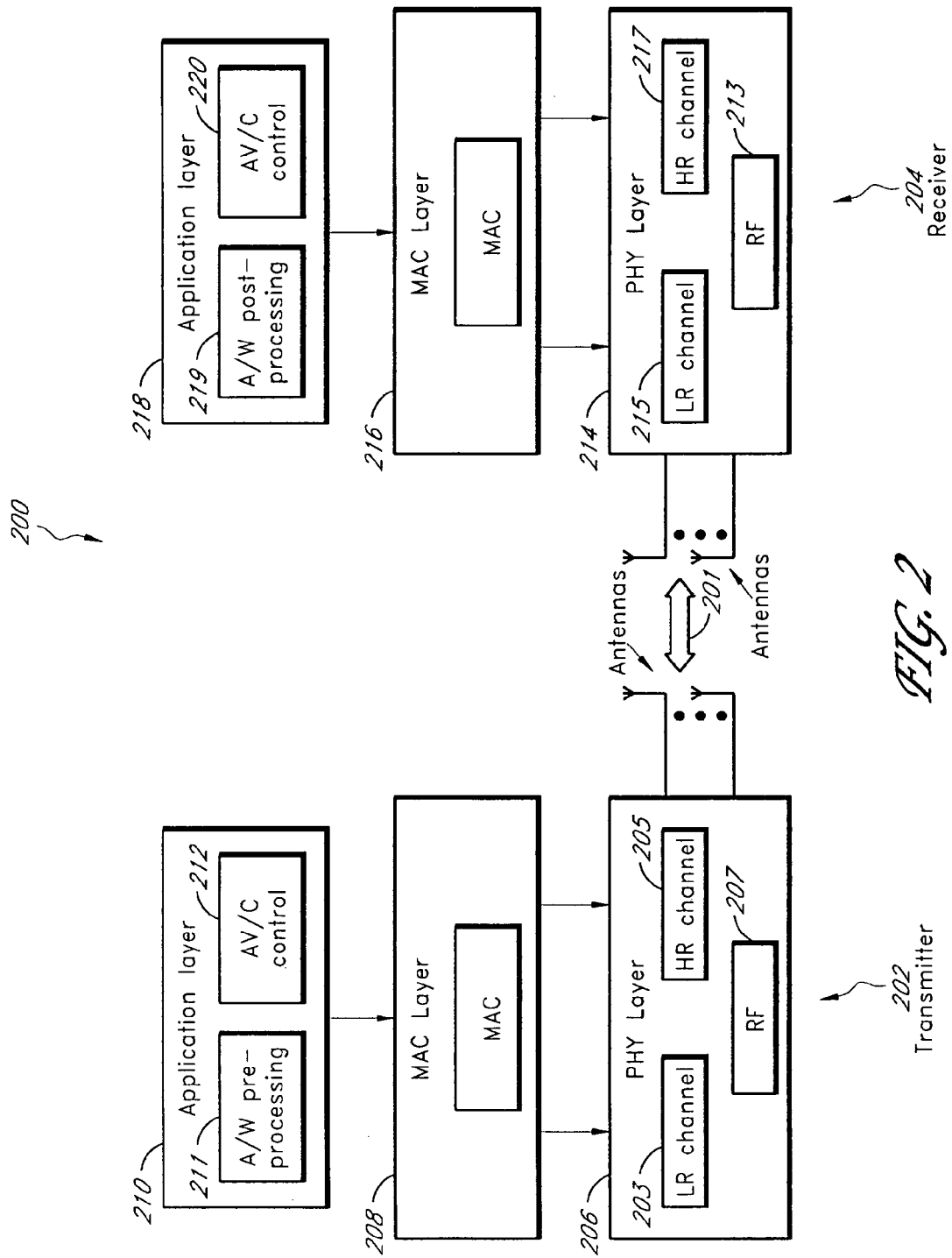
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
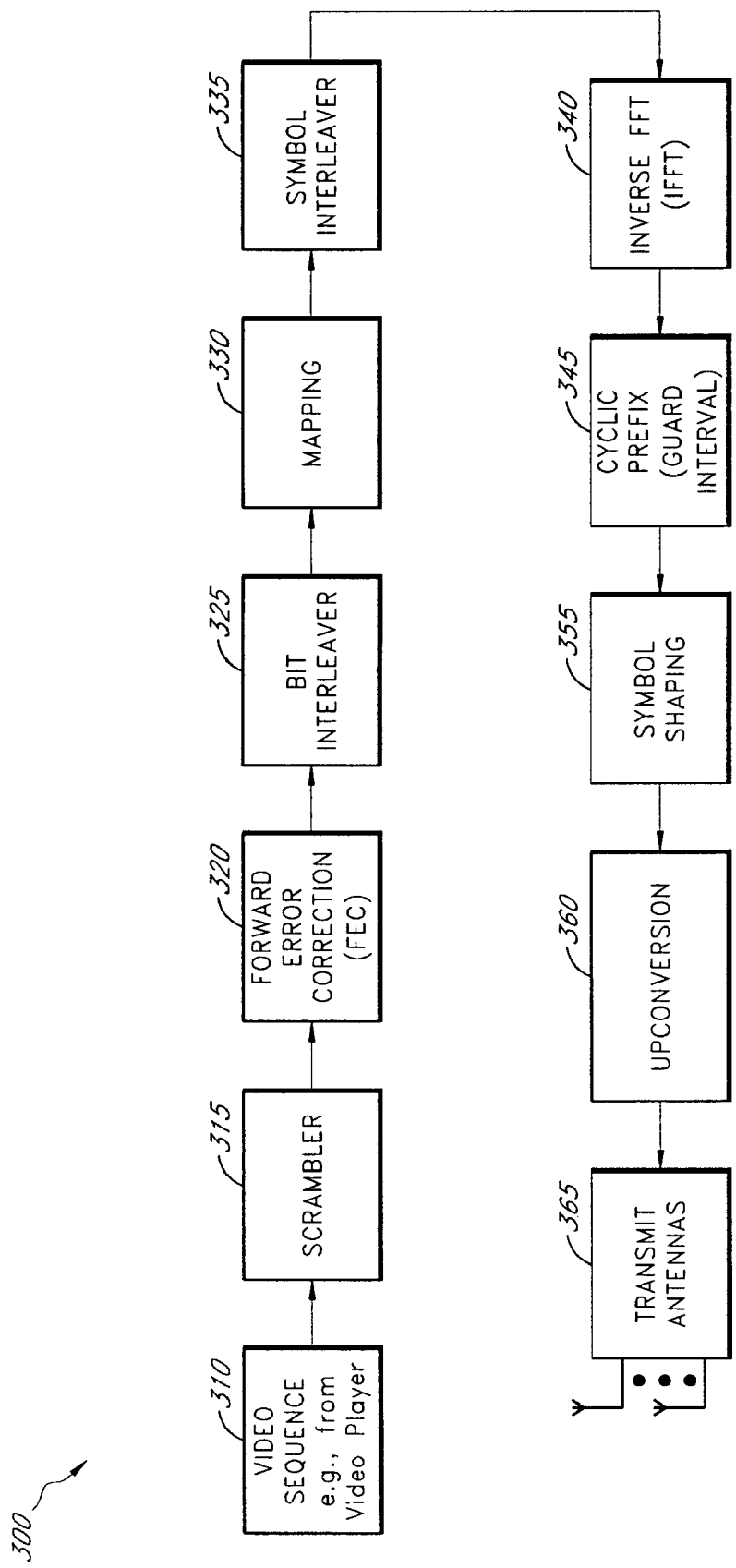
FIG. 3 is a functional block diagram of an example transmitter for transmission of uncompressed HD video over a wireless medium, according to one embodiment of the system and method.

FIG. 3 is a functional block diagram illustrating an example of a transmit chain 300 comprising modules, subsystems or devices, such as used in the PHY block 206 (FIG. 2). It will be appreciated that these modules, subsystems, or devices can be implemented using hardware, software or a combination of both. A video sequence 310 having video data, such as from a video player or other device, is input into a scrambler 315. The scrambler 315 transposes or inverts signals or otherwise encodes data to make the data unintelligible at a receiver not equipped with a corresponding descrambling device. Scrambling is accomplished by the addition of components to the original signal or the changing of some important component of the original signal in order to make extraction of the original signal difficult. Examples of the latter can include removing or changing vertical or horizontal sync pulses in video signals.

A forward error correction (FEC) subsystem 320 receives output from the scrambler and provides protection against noise, interference and channel fading during wireless data transmission. The FEC subsystem 320 adds redundant data to the scrambled video data input to the subsystem. The redundant data allows the receiver to detect and correct errors without asking the transmitter for additional data. In adding redundant data to the video data, the FEC subsystem 320 can use various error correction codes, such as a Reed-Solomon (RS) encoder and a convolutional code (CC) encoder. In other embodiments, the FEC subsystem 320 may use various other encoders, including, but not limited to, a LDPC encoder, a Hamming encoder, and a Bose, Ray-Chaudhuri, Hocquenghem (BCH) encoder.

The output of the FEC 320 is sent to a bit interleaver 325. The bit interleaver 325 rearranges a sequence of data bits received from the FEC 320. The bit interleaver 325 serves to provide further error-protection over video data transmitted over a wireless medium. The output of the bit interleaver 325 is sent to a mapper 330. The mapper 330 maps data bits to complex (IQ) symbols. The complex symbols are used to modulate a carrier for the wireless transmission described above. The mapper 330 can use various modulation schemes, including, but not limited to, Binary Phase-Shift Keying (BPSK), Quadrature Phase-Shift Keying (QPSK), and Quadrature Amplitude Modulation (QAM). In one embodiment, the mapper 330 is a QAM mapper, for example, a 16-QAM mapper or 64-QAM mapper. QAM is a modulation scheme which conveys data by modulating the amplitude of two carrier waves. The two waves, usually two orthogonal sinusoids, are out of phase with each other by 90° and thus are called quadrature carriers. The number, 16 or 64, in front of "QAM" refers to the total number of symbols to which the mapper can map groups of data bits. For example, a 16-QAM mapper converts 4-bit data into $2^4=16$ symbols. Typically, for QAM mappers, a constellation diagram is used for representing the collection of such symbols.

The output of the mapper 330 is sent to a symbol interleaver 335 that rearranges the sequence of complex symbols output from the mapper. The illustrated symbol interleaver 335 is positioned after the mapper 330. In other embodiments, the symbol interleaver 335 may be positioned between the FEC and the mapper 330 in place of the bit interleaver. In such embodiments, the symbol interleaver permutes the predetermined number of bits as a symbol group. For example, in an embodiment where a QAM mapper maps four data bits to a complex symbol, the symbol interleaver is configured to interleave groups of four data bits.

In an embodiment where the symbol interleaver 335 is positioned after the mapper 330, the symbol interleaver rearranges the sequence of the symbols output from the mapper 330. In one embodiment, the symbol interleaver 335 can include a random interleaver which employs a fixed random permutation order and interleaves symbols according to the permutation order. For example, the random interleaver may use Radix-2 FFT (fast fourier transform) operation. In other embodiments, the symbol interleaver 335 can include a block interleaver. A block interleaver accepts a set of symbols and rearranges them without repeating or omitting any of the symbols in the set. The number of symbols in each set is fixed for a given interleaver. The interleaver's operation on a set of symbols is independent of its operation on all other sets of symbols.

The output of the symbol interleaver 335 is sent to an inverse Fast Fourier Transform (IFFT) module 340. The IFFT 340 transforms frequency domain data from the error-correcting, mapping and interleaving modules back into corresponding time domain data. The IFFT module 340 converts a number of complex symbols, which represent a signal in the frequency domain, into the equivalent time domain signal. The IFFT module 340 also serves to ensure that carrier signals produced are orthogonal. The output of the IFFT 340 is sent to a cyclic prefix adder 345 so as to decrease receiver complexity. The cyclic prefix adder 345 may also be referred to as a guard interval inserter. The cyclic prefix adder 345 adds a cyclic prefix interval (or guard interval) to an IFFT-processed signal block at its front end. The duration of such a cyclic prefix interval may be 1/32, 1/16, 1/8, or 1/4 of the original signal block duration, depending on realistic channel conditions and affordable receiver complexity.

At this point of the transmit chain 300, a preamble is part of the header 310 and prior to the IFFT-processed signal block. Generally, a preamble is selected by the designers of the system 200, such as previously described, and is standardized so that all devices of the system understand it. The use of preamble is to detect start of the packet, estimate various channel parameters, such as symbol timing, carrier frequency offset so that data reception can be done successfully.

A symbol shaping module 355 interpolates and low-pass filters the packet signal generated from the IFFT module 340, the cyclic prefix adder 345 and the preamble. The output of the symbol shaping module 355 is a complex baseband of the output signal of the IFFT module 340. An upconverter 360 upconverts the output of the symbol shaping module 355 to a radio frequency (RF) for possible meaningful transmission. A set of transmit antennas 365 transmit the signal output from the upconverter 360 over a wireless medium, such as the wireless channel 201 (FIG. 2) to a receiver. The transmit antennas 365 can include any antenna system or module suitable for wirelessly transmitting uncompressed HD video signals.

Figure 4:
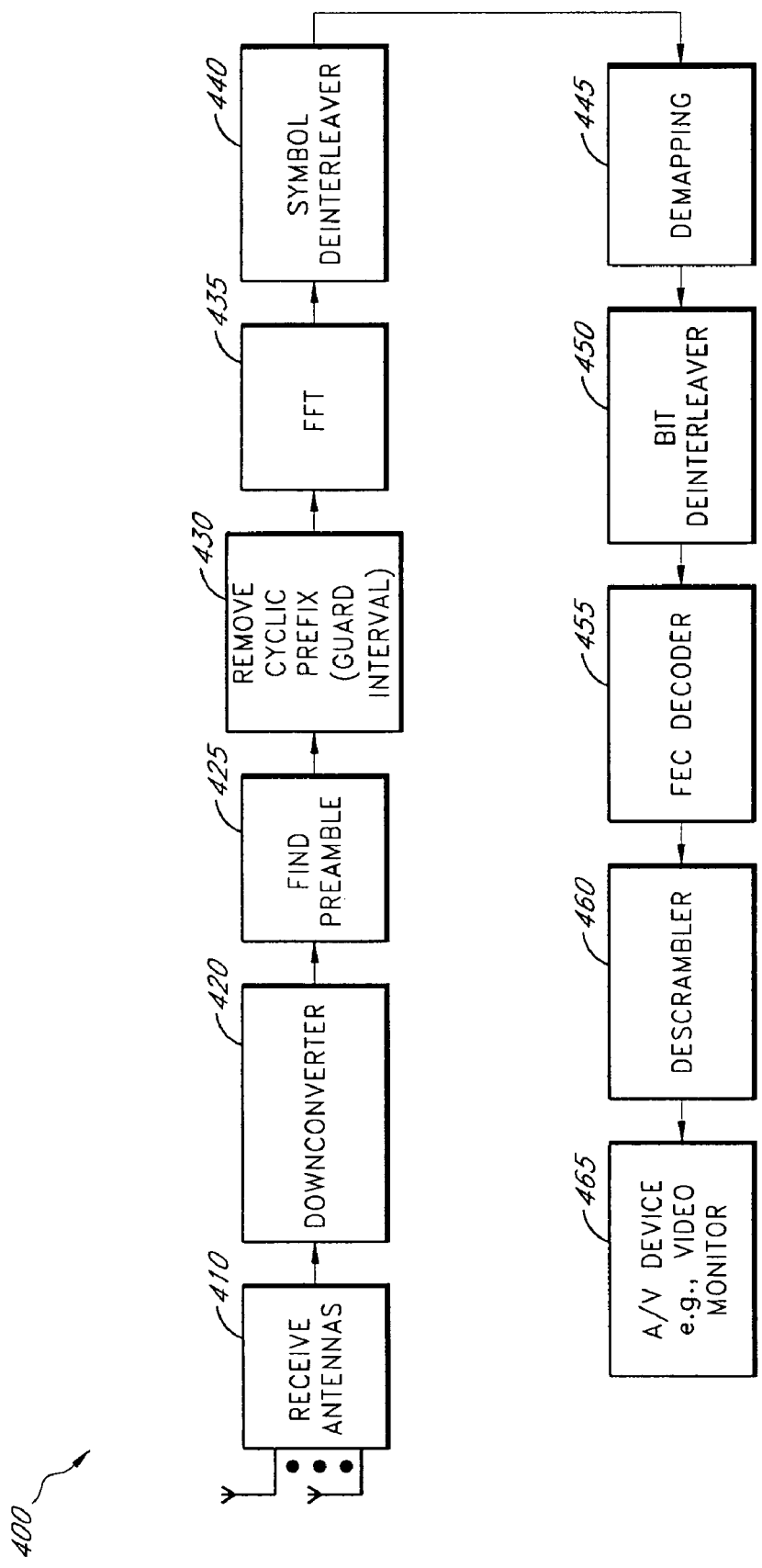
FIG. 4 is a functional block diagram of an example receiver for receipt of uncompressed HD video over a wireless medium, according to one embodiment of the system and method.

FIG. 4 is a functional block diagram illustrating a receiver chain 400 of modules, subsystems or devices, such as used in the PHY block 214 (FIG. 2). The receiver chain 400 generally performs an inverse process of that of the transmitter chain 300 of FIG. 3. The receiver 400 receives an RF signal via the wireless channel 201 (FIG. 2) at receive antennas 410 from the transmit antennas 365 of the transmitter chain 300. A downconverter 415 downconverts the RF signal to a signal of a frequency suitable for processing, or the baseband signal, which is already in the digital domain for easy digital signal processing. A preamble finder 420 then locates a preamble portion of the digital signal, finds the symbol starting timing, estimates the channel coefficients, estimates the carrier frequency offset and tries to compensate it via local processing.

Figure 7:
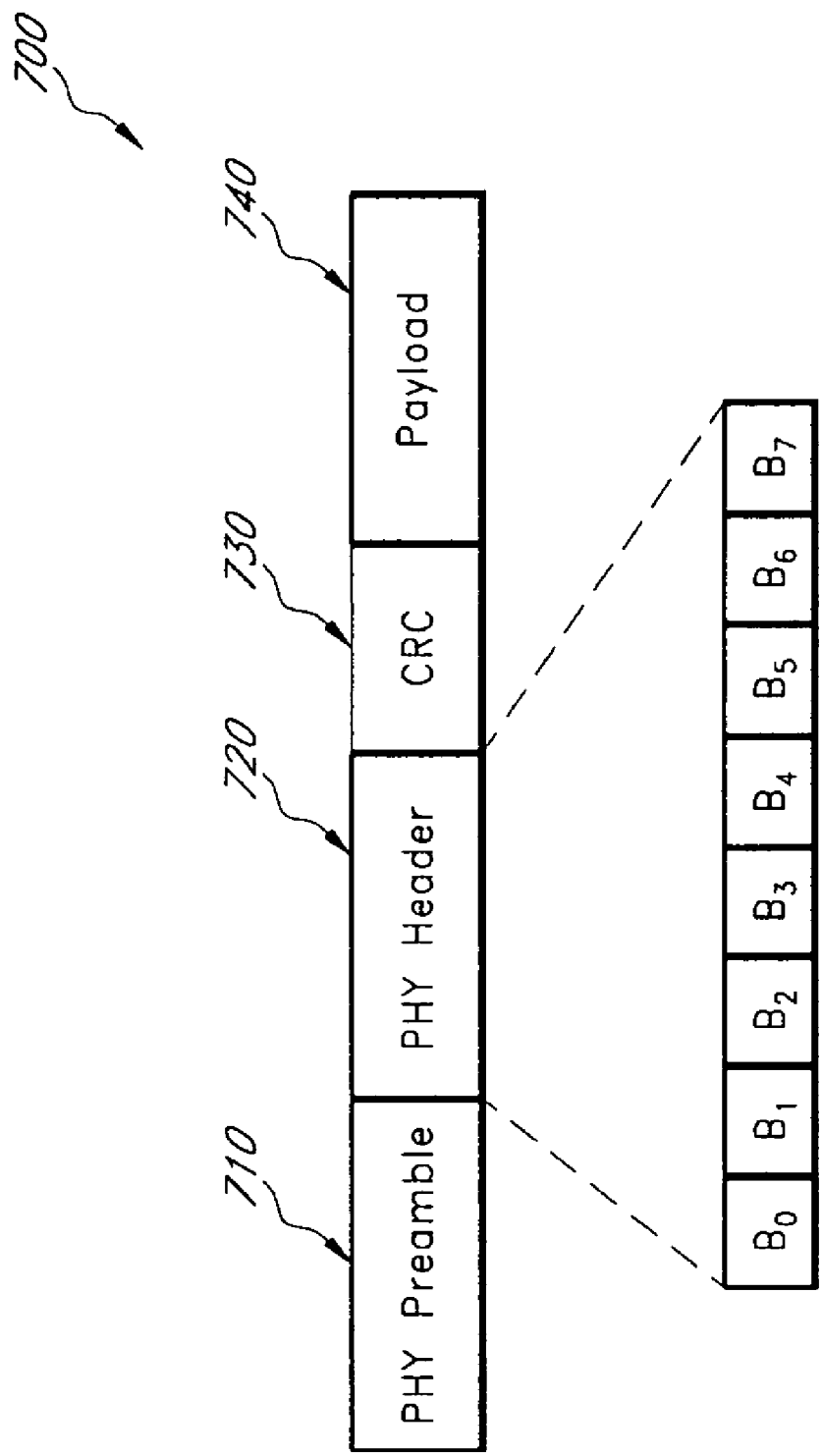
FIG. 7 is a timeline for the acknowledgment (ACK) signals of FIG. 6, according to one embodiment.

In certain embodiments, the preamble finder 420 includes a correlator and a packet start finding algorithm that can operate on the short training sequences of the preamble (FIGS. 4 and 7). After the preamble is identified by the finder 420, the preamble portion of a current signal packet is sent to a channel estimation, synchronization and timing recovery component 425, which will be further described below. A cyclic prefix remover 430 removes the cyclic prefix from the signal. Next, a fast Fourier transform (FFT) module 435 transforms the signal (a time-domain signal) into a frequency-domain signal. The output of the FFT 435 is used by a symbol deinterleaver 440 which rearranges the FFT output for a demapper 445. The demapper 445 converts the frequency-domain signal (a complex signal) into a bit stream in the time domain. A bit deinterleaver 450 rearranges the bit stream in the original bit stream sequence as before the bit interleaver 325 of FIG. 3.

Subsequently to the bit deinterleaving, a FEC decoder 455 decodes the bit stream, thereby removing redundancy added by the FEC 320 of FIG. 3. In one embodiment, the FEC decoder 455 includes a demultiplexer, a multiplexer, and a plurality of convolutional code (CC) decoders interposed between the demultiplexer and the multiplexer. Finally, a descrambler 460 receives the output from the FEC decoder 455, and then descrambles it, thereby regenerating the video data sent from the transmitter chain 300 of FIG. 3. A video device 465 can now display video using the video data. Examples of the video device include, but are not limited to, a CRT television, an LCD television, a rear-projection television and a plasma display television. It will be appreciated that audio data can also be processed and transmitted in the same manner along with video data by the wireless HD A/V system described above. The audio data can be processed and transmitted using a different wireless transmission scheme. The descrambler 460, FEC decoder 455, bit deinterleaver 450, demapper 445, symbol deinterleaver 440, FFT 435 cyclic prefix remover 430, down-converter 415 and receive antennas 410 of the receiver chain 400 perform analogous but inverse functions of the corresponding scrambler 315, FEC 320, bit interleaver 325, mapper 330, symbol interleaver 335, IFFT 340, cyclic prefix adder 345, upconverter 360 and transmit antennas 365 of the transmit chain 300.

Video signals can be represented by pixel data that encodes each pixel as several values, e.g., using a RGB color model (red, green, and blue), or a YUV (one luminance and two chrominance values). Generally, viewers are more sensitive to transmission errors or loss of data in the most significant bits (MSB) of pixel values than to errors or loss in the least significant bits (LSB) of pixel values. Thus, in one embodiment, the MSB of each pixel value (e.g. 4 out of 8 bits per color channel) is encoded with a different coding and/or modulation scheme than for the remaining LSB of each pixel value.

As described above with reference to FIG. 1, the wireless HD A/V system can include a low-rate (LR) channel and a high-rate (HR) channel according to one embodiment. The two channels operate in time-division duplex (TDD) mode, i.e., only one channel can be activated at any given instance.

FIG. 5A is a diagram illustrating a low-rate (LR) channel established between two devices in the wireless system 500 according to one embodiment. Examples of the devices include, but are not limited to, a DVD player, an HD television, a home theater device, a media server, a printer, and an overhead projector. The illustrated system 500 includes a display device 510 (e.g., HD television, an overhead projector, etc.) and a video source device 520 (e.g., a set-top box (STB), a DVD player, a VCR, a TiVo® recorder, etc.). In the illustrated embodiment, the video source device 520 is a sender of video data whereas the display device 510 is a receiver. In other embodiments, if a high rate channel between the devices 510, 520 is symmetric, the video source device 520 may also operate as a receiver whereas the display device 510 serves as a sender depending on the direction of data transmission. For example, the display device 510 (e.g., an HD television) may receive broadcast video data and send it to the video source device 520 (e.g., a DVD recorder) for storing the video data.

The LR channel is a symmetric control channel. The LR channel may operate in two modes: omni-directional mode 530 and directional (beam-formed) mode 540.

The omni-directional mode 530 is used for transmission of control data such as beacon, association and disassociation, device discovery, acknowledgment (ACK), and the like. The omni-directional mode 530 can support a data rate of about 2.5 to about 10 Mbps. The omni-directional mode 530 can be established using any suitable omni-directional antennas. The omni-directional antennas are configured to radiate power substantially uniformly in all directions. Examples of the omni-directional antennas include, but are not limited to, a whip antenna, a vertically oriented dipole antenna, a discone antenna, and a horizontal loop antenna.

The directional mode 540 can be used for transmitting low-volume data, for example, audio data. The directional mode 540 may support a data rate of about 20 to about 40 Mbps. The directional mode 540 can be established by forming a beam between the two devices 510, 520 in the system. It will be appreciated that any suitable directional antennas can be adapted for beam-forming. A skilled technologist will appreciate that various communication technologies can be adapted for implementing the directional or omni-directional modes.

FIG. 5B is a diagram illustrating an asymmetric directional channel 550 established between a display device 510 (e.g., a digital TV (DTV)) and a video source device 520 (e.g., a set-top box (STB), a DVD player (DVD)) in the wireless system 500 according to one embodiment. The directional channel includes a high rate (HR) channel 550$a$ and a low rate (LR) channel 550$b$. The channel 550 can be established by forming a beam between the devices 510, 520. The HR channel 550$a$ can be used for transmission of uncompressed video data from the video source device 520 to the display device 510. The HR channel 550 may support a data rate of about 3 to about 4 Gbps. The packet transmission duration on the HR channel 550 can be about 100 µs to about 300 µs. In the illustrated embodiment, the display device 510 can send ACK to the video source device 520 via the LR channel 550$b$ after receiving video data from the video source device 520.

In one embodiment, the wireless communication system 500 is configured to wirelessly transmit uncompressed HD television signals. The wireless communication system 500 can use 60 GHz-band mm wave technology to transmit signals at a rate of about 3 to about 4 Gbps. The wireless system 500 can use the high-rate (HR) directional channel for transmitting/receiving HD signals. The system 500 may support 1080 p HD formats which requires a raw data rate of 2.98 Gbps (frame size×the number of frames per second=(1920× 1080×3×8)×60).

Figure 6:
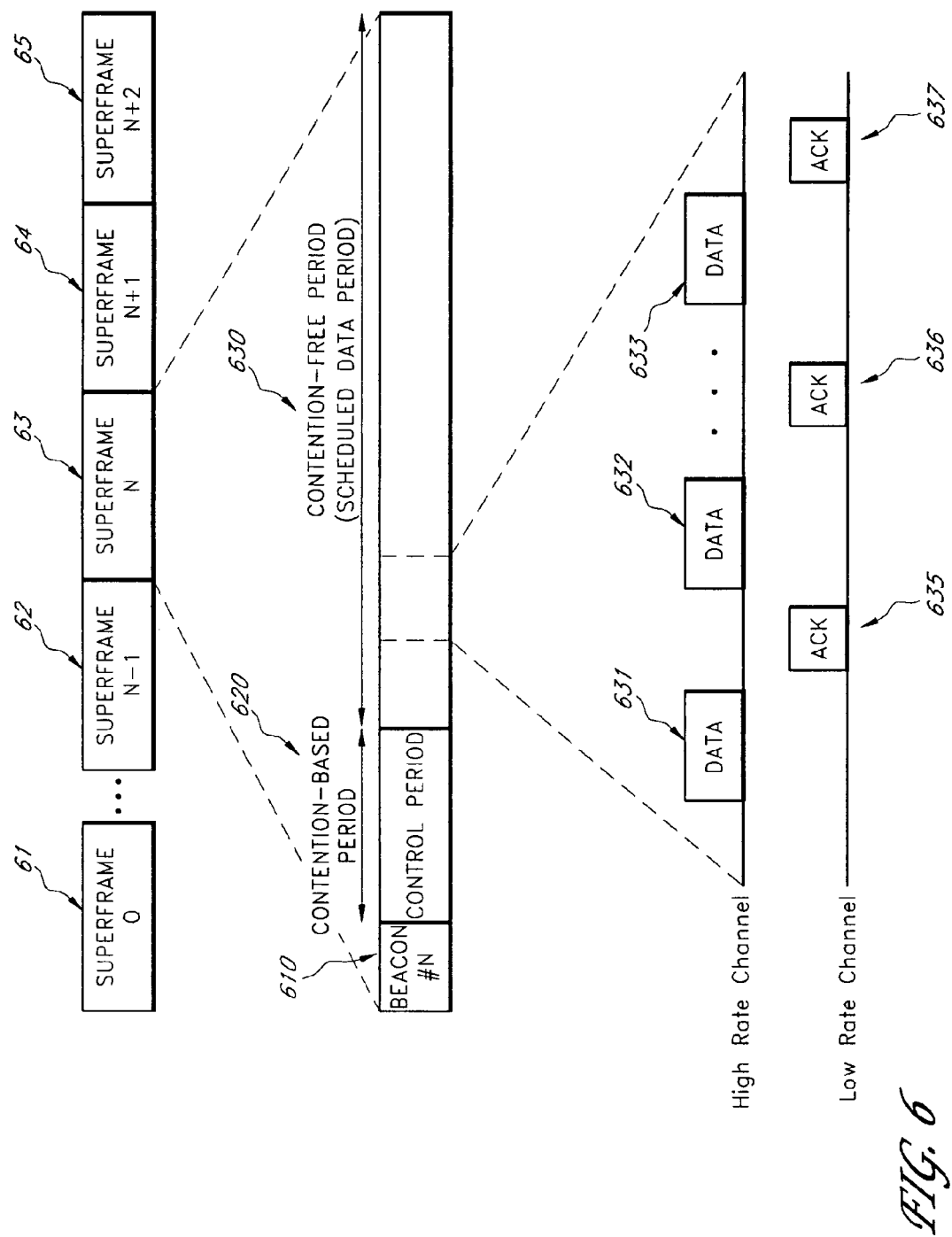
FIG. 6 is a timeline for packet transmission using Time Division Duplex (TDD) scheduling, according to one embodiment.

In one embodiment, the wireless HD A/V system described above can use a data transmission timeline shown in FIG. 6 for communication between two devices in the system. One of the devices in the system can act as a controller which is responsible for managing superframes 61-65, as shown in FIG. 6. In the illustrated embodiment, a video data sender may serve as a controller. Each of the superframes 61-65 includes, in sequence, a beacon period 610, a contention-based period (CBP) 620, and a contention-free period (CFP) 630. The contention-based period (CBP) 620 may also be referred to as a "control period." The contention-free period 630 may also be referred to as a "scheduled data period."

During the beacon period 610, the controller (or the video data sender in the illustrated embodiment) sends a video data receiver a beacon packet which may contain various timing information. In one embodiment, the timing information may include time allocation information for the contention-based period 620 and the contention-free period 630. The timing information may further include time synchronization information. In one embodiment, the controller is configured to periodically transmit the beacon packet over the low-rate channel.

During the contention-based period 620, the video data sender in the system monitors the channels (HR and/or LR channels) and determines if the channel is silent for a predetermined period of time. If so, the sender transmits data.

The sender transmits AV data packets to the receiver during the contention-free period 630 which follows the contention-based period 620. During the contention-free period 630, multiple data packets 631, 632, 633 are transmitted at a predetermined interval over the high-rate channel. The data packets can contain video data. In other embodiments, the data packets may also include audio and control data, or file transfer data.

In one embodiment, after the sender has transmitted data packets 631, 632, 633 to the receiver, the receiver may send acknowledgment signals 635, 636, 637 to the sender upon receiving the data packets. The acknowledgment signals serve to notify the sender of the safe receipt of at least one data packet. In the illustrated embodiment, after receiving each data packet, the receiver sends an acknowledgment signal to the sender before receiving another data packet. The acknowledgment signals can be transmitted over the LR channel.

Acknowledgment (ACK) Frames

In the wireless HD A/V system described above, the two channels (HR and LR channels) operate in time division duplexing (TDD) mode. Thus, the two channels cannot be simultaneously used. Because transmission of uncompressed video signals in the system involves transmission of a high volume of data, there is a need for an efficient use of the channels.

In the embodiment illustrated in FIG. 6, during the contention-free period 630, the high-rate (HR) channel is used for transmission of data packets whereas the low-rate (LR) channel is used for transmission of acknowledgment (ACK) signals. In one embodiment, the ACK signals 635, 636, 637 are configured to have a reduced size to allow more time for the data packets 631, 632, 633.

For example, an ACK frame used in the system does not include a MAC header, thereby reducing its overall ACK frame size. Typically, ACK frames include a MAC header indicating source and destination addresses. In the wireless system described above, data transmission occurs in scheduled reserved slots or contention-free data periods. For each reserved slot, all devices or stations in the system network know in advance about the sender and the receiver by parsing the beacon frame. Thus, the source and destination addresses are redundant information. Therefore, the ACK frame can include no MAC header, without adversely affecting its operation. This configuration reduces the size of the ACK frame, and minimizes time required for the ACK transmission over the LR channel.

The reduced ACK frame size enhances the availability of the channels. Reducing the ACK size, or the time duration for which the LR channel is busy can provide the HR chancel with more available free time. This extra free time (or available time) on the HR channel can be used for appending some redundancy bits to data packets for error-recovery, or for supporting data re-transmission over the HR channel. In another embodiment, the saved time may be used for supporting more stations in the wireless system. In yet another embodiment, beam-tracking data can be piggybacked onto an ACK frame using the saved time. The beam-tracking data may be used for accurate control of a beam established between the sender and receiver.

FIG. 7 illustrates a timeline for the frame format 700 of the ACK signals of FIG. 6, according to one embodiment. The illustrated ACK frame format 700 includes in sequence a PHY preamble 710, a PHY header 720, a cyclic redundancy check (CRC) field 730, and a payload field 740. In the context of this document, the illustrated ACK frame format 700 may be referred to as "PHY-ACK." In the illustrated embodiment, the ACK frame format 700 supports both directional and omni-directional ACK. The directional ACK (D-ACK) uses the directional (beam-forming) mode of the LR channel whereas the omni-directional ACK (O-ACK) relies on the omni-directional mode of the LR channel.

The PHY preamble 710 is used for synchronizing the sender and the receiver so that the receiver can correctly receive the ACK signal. The PHY preamble 710 can have a length which depends upon the physical (PHY) layer technology and the transmission mode. The transmission mode can be omni-directional or directional mode as described above. In the omni-directional mode, the PHY preamble 710 may last about 35 µs to about 70 µs, optionally about 60 µs. In the directional mode, the PHY preamble may last about 2 µs to about 4 µs. It will be appreciated that the duration of the PHY preamble 710 can vary widely depending on the design of the ACK frame format.

An ACK receiver (which receives the ACK signal described above) determines the type of ACK based on the PHY preamble 710, for example, the duration of the PHY preamble. In certain embodiments, the PHY rate of D-ACK and O-ACK is fixed. In such embodiments, the ACK receiver can determine the PHY rate, based on the PHY preamble.

The PHY header 720 can include various information and format. The format of the PHY header may depend on the ACK type such as D-ACK or O-ACK. In one embodiment, the PHY header 720 includes multi-bit data sequence, as shown in FIG. 7. The data sequence can include 8 bits, $B_0$, $B_1$, $B_2$, $B_3$, $B_4$, $B_5$, $B_6$, and $B_7$. Each bit in the sequence may include different information, depending on whether the system uses D-ACK or O-ACK.

In one embodiment, $b_0$ indicates whether equal or unequal error protection is used for transmission of a data packet over the HR channel. The term "equal error protection" (EEP) generally refers to providing all the bits in a data packet with substantially the same degree of error protection. This can be achieved by using the same encoding scheme, for example, at the FEC module 303 of FIG. 3, for all the bits in a data packet. On the other hand, the term "unequal error protection" (UEP) generally refers to providing certain bits in a data packet with more or less error protection. The unequal error protect can be provided by using different encoding schemes for different bits, for example, at the FEC module 303 of FIG. 3. In one embodiment, the most significant bits (MSB) of a byte (8 bits) of data are provided with a higher degree of protection whereas the least significant bits (LSB) of the byte are provided with a lower degree of protection. In the illustrated embodiment, when equal error protection is used, $B_0$ is set to "0." On the other hand, if unequal error protection is used, $B_0$ is set to "1." This encoding scheme for bit $B_0$ is summarized in Table 1 below.

TABLE 1

| $B_0$ Value | Description |
|---|---|
| 0 | Equal Error Protection (EEP) |
| 1 | Unequal Error Protection (UEP) |

The encoding scheme for the bits $B_0$-$B_5$ can vary depending on whether the ACK is D-ACK or O-ACK. In one embodiment, when equal error protection is used ($B_0$=0), in case of D-ACK, the bits $B_1$-$B_5$ may be used to indicate the status of five subpackets of a data packet received from the sender. In certain embodiments, each of the bits $B_1$-$B_5$ may be configured to indicate the status of both LSBs (least significant bits) and MSBs (most significant bits) of an uncompressed video sub-packet. In case of O-ACK ($B_0$=0), only the bit $B_1$ may be used to indicate the status of a packet received from the sender while the bits $B_2$-$B_5$ are reserved and set to zero.

When unequal error protection is used ($B_0$=1), in case of D-ACK, the bits $B_1$-$B_5$ may be used to indicate the status of five sub-packets. In certain embodiments, each of the bits $B_1$-$B_5$ may be configured to indicate the status of only MSBs of an uncompressed video sub-packet. In case of O-ACK ($B_0$=1), the bits $B_1$-$B_5$ are reserved and set to zero. The encoding scheme for the bits $B_1$-$B_5$ is summarized in Table 2 below.

TABLE 2

| | $B_0$ Value | |
|---|---|---|
| | 0 | 1 |
| D-ACK | Bits $B_1$-$B_5$ indicate the status of five subpackets of a packet received. The status of both LSBs (least significant bits) and MSBs (most significant bits) of an uncompressed video sub-packet is indicated. | Bits $B_1$-$B_5$ indicate the status of five sub-packets of a packet received. The status of only MSBs of an uncompressed video sub-packet is indicated. |
| O-ACK | Bit $B_1$ indicate the status of a packet received. Bits $B_2$-$B_5$ are reserved and set to zero. | Bits $B_1$-$B_5$ are reserved and set to zero. |

Under the encoding scheme described above, in the cases of D-ACK, the encoding detail of the bits $B_1$-$B_5$ is as shown in Table 3.

TABLE 3

| $B_1$ | $B_2$ | $B_3$ | $B_4$ | $B_5$ |
|---|---|---|---|---|
| Status of sub-packet 1 | Status of sub-packet 2 | Status of sub-packet 3 | Status of sub-packet 4 | Status of sub-packet 5 |

As described above, some bits in the PHY header 720 can be used to indicate the status of sub-packets. Assuming that there are five sub-packets in a data packet, the bits $B_1$-$B_5$ may be used to indicate the status of the five sub-packets. The interpretation of these bits at the sender depends on the ACK mode: omni-directional or directional as described above. For instance with UEP and D-ACK, the receiver sets a bit Bi (i is an integer from 1 to 5 in the illustrated embodiment) corresponding to a sub-packet to "1" if the cyclic redundancy check (CRC) checksum over MSB bits of that sub-packet is successful. Otherwise, the receiver sets the bit Bi to "0." Details of the CRC will be described below.

In one embodiment, the bits $B_6$ and $B_7$ may be used to carry additional information, for example, regarding the payload field 740. An exemplary encoding scheme for the bits $B_6$ and $B_7$ are shown in Table 3.

TABLE 4

| $B_6B_7$ Value | Description |
|---|---|
| 00 | No payload |
| 01 | Payload includes beam-tracking data |
| 10 | Payload includes non-bream-tracking data (e.g., some aggregated packets such as MAC control or Advanced Video Coding (AVC) control) |
| 11 | Reserved |

The CRC field 730 includes a checksum calculated from a block of data in a data packet or sub-packet to detect error after transmission. The checksum is computed and appended before transmission. Then, the checksum is verified afterwards by the receiver to confirm that no change has occurred during transmission. In the illustrated embodiment, the CRC field 730 includes an eight-bit checksum calculated over the PHY header 720, based on a CRC-8 scheme. The CRC-8 scheme can be defined by a polynomial of Equation 1 below.

$$x^8 + x^2 + x + 1 \tag{1}$$

In some embodiments, a separate CRC checksum may be provided for the payload field 740 for error detection. In certain embodiments, both the sender and receiver may support multiple CRC schemes. For example, MSB's may be provided with a CRC checksum and LSB's may also be provided with another CRC checksum. It will be appreciated that various configurations of CRC schemes can be adapted for the CRC field 730.

The payload field 740 may include beam-tracking information. As shown in FIG. 5, HR data transmission occurs using two beams in the directional mode. Periodic beam-tracking data may need to be exchanged between the sender and the receiver to keep the two beams locked with each other. In one embodiment, the sender can piggyback beam-tracking data onto a data packet transmitted of the HR channel. The receiver can also piggyback beam-tracking data onto an ACK signal (for example, in the payload field 740 of FIG. 7) transmitted over the LR channel.

In certain embodiments, the payload field 740 may also include other information, such as user information and user overhead information. It may include user-requested additional information, such as network, management and accounting information. In another embodiment, the payload field 740 can also be used with the O-ACK to send additional data such as control frames or data. As described above, if a payload field is present in an ACK signal frame, it may also provide its own CRC checksum to ensure the accuracy of the data thereof.

In certain embodiments, the ACK described above can be transmitted out of band. For example, the ACK is transmitted on IEEE 802.11 (at about 2.4 GHZ), Bluetooth®, or some other channel which is outside 60 GHz band. In other embodiments, the ACK may be transmitted outside the high rate (HR) channel band, but still on 60 GHz band. In such embodiments, the system uses frequency division duplex (FDD). It will be appreciated that various other channels and wireless communication technologies can be used for transmitting the ACK.

In other embodiments, an ACK sender receives data packets via a low-rate channel, and sends an acknowledgment signal via the low-rate channel. The low-rate channel may be in either a directional mode or an omni-directional mode. In one embodiment, when the ACK sender receives data packets in the directional mode, it can transmit a directional acknowledgment signal. In another embodiment, when the ACK sender receives data packets in the omni-directional mode, it can transmit an omni-directional acknowledgment signal. It will be appreciated that various other combinations of data packet and ACK transmission are also possible.

Payload Optimization

As described above, an acknowledgment signal (ACK) may include a payload field. The payload field may include various kinds of information, such as user information and user overhead information. The payload field may include user-requested additional information, such as network, management and accounting information.

In one embodiment, the payload field can include data indicative of beam-tracking between two devices (a sender and a receiver) in the wireless HD system described above. In the wireless HD system, devices can have an array of multiple antenna elements (or antennas). The output of this antenna element array can be controlled such that radiated power can be enhanced in some directions and reduced in other directions. In other words, output signals from these antenna elements may be adjusted to add constructively in some directions and to add destructively in other directions.

At the beginning of data communication between the two devices in the system, beam-forming is performed to initiate a wireless link between them. After beam-forming has been completed, beam-tracking is performed to provide adjustments to the output signals of the antenna elements. These adjustments mitigate certain impairment due to changes in the environment. Beam-tracking provides fine tuning so that the wireless link between the devices remains operational. In one embodiment, beam-tracking is performed periodically at fixed intervals.

In the context of this document, the term "beam-tracking data" refers to data required for beam-tracking. The data may be indicative of the status of various beam-tracking parameters at either or both of the two devices (the sender and the receiver) in the wireless HD system.

Figure 8:
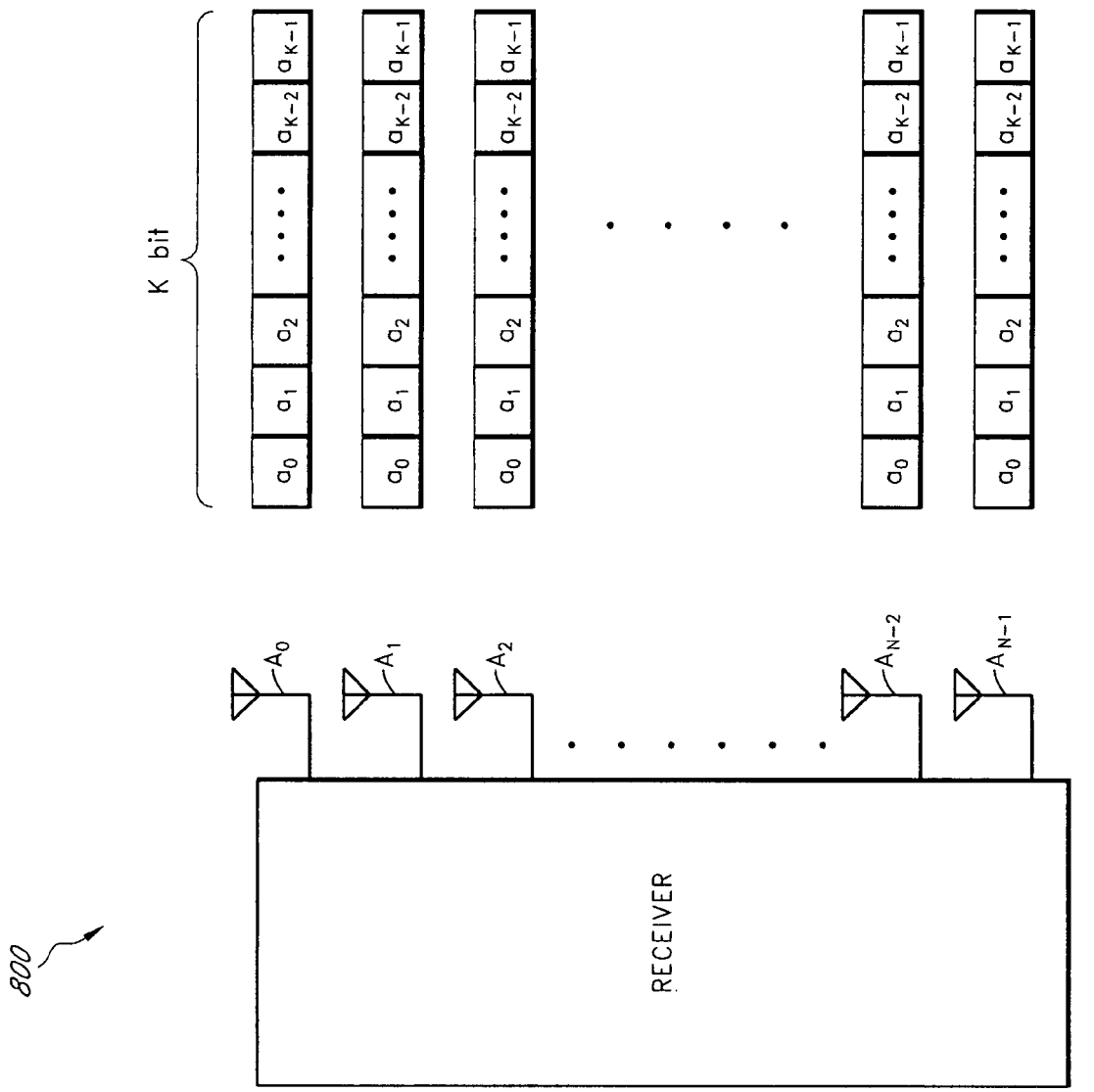
FIG. 8 illustrates one embodiment of a receiver having multiple antenna elements which can be used with the wireless network of FIG. 1.

Referring to FIG. 8, in one embodiment, a receiver 800 may include N number of antenna elements $A_0$-$A_{N-1}$ for beam-forming with a sender. The receiver 800 may be used with the wireless network of FIG. 1. The status of each antenna element can be represented by K-bit data. For example, the status of each of the antenna elements $A_0$-$A_{N-1}$ can be represented by bits $a_0, a_1, a_2, \ldots a_{K-2}$, and $a_{K-1}$.

In the illustrated embodiment, the beam-tracking data in the payload field (e.g., the payload field 740 of FIG. 7) may include N×K bits for the N number of antenna elements $A_0$-$A_{N-1}$. In the context of this document, the payload scheme using N×K bits can be referred to as a "non-optimized scheme."

Figure 9:
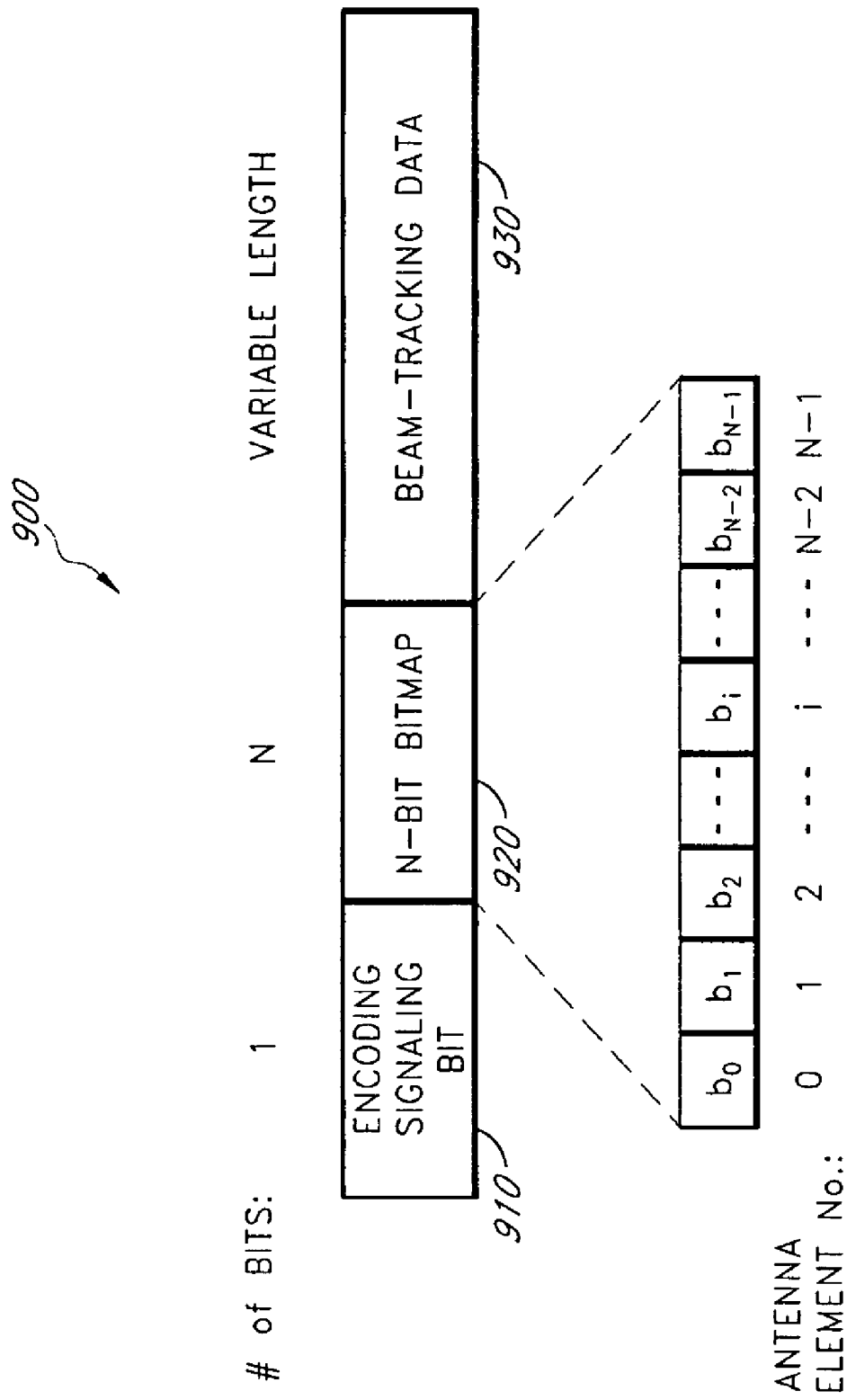
FIG. 9 is a timeline for a payload field for the ACK signals of FIG. 6, according to one embodiment.

In one embodiment, the payload field may be optimized to carry less bits than the non-optimized scheme. FIG. 9 illustrates one embodiment of an optimized payload field 900. In one embodiment, the payload field 900 may be part of one of the ACK signals of FIGS. 6 and 7. In the context of this document, the payload scheme using this optimized payload field can be referred to as an "optimized scheme." The payload field 900 includes an encoding signaling bit 910 (1 bit), a bitmap 920 (N bits), and a beam-tracking data field 930 (a variable length of bits).

The encoding signaling bit 910 is configured to indicate which encoding scheme the devices use in forming the payload field of the ACK signal. For example, "1" indicates the non-optimized scheme whereas "0" indicates the optimized scheme.

The bitmap 920 is configured to indicate whether the beam-tracking data status of the antenna elements $A_0$-$A_{N-1}$ has changed compared to the immediately previous status of the antenna elements $A_0$-$A_{N-1}$. In the illustrated embodiment, the bitmap 920 includes N bits $b_0$-$b_{N-1}$ for N antenna elements $A_0$-$A_{N-1}$. If the status of one of the antenna elements has changed compared to the immediately previous status thereof, a bit $b_i$ indicating the status of that antenna element in the bitmap 920 is set to "1," and otherwise "0."

The beam-tracking data field 930 includes the current beam-tracking data of antenna elements of which the status has changed compared to the immediately previous status thereof. For each of the antenna elements with such a changed status, the beam-tracking data field 930 includes K bit data indicative of the current status of the antenna element. For example, when there are P ($0 \leq P \leq N$) number of antenna elements with a changed status, the beam-tracking data field 930 includes P×K bits for the P antenna elements.

In certain cases, however, the payload field 900 may carry more bits under the optimized scheme than under the non-optimized scheme. This occurs when the additional bits $b_0$-$b_{N-1}$ in the bitmap 920 only increase the total length of the payload field 900. Equation 2-1 below shows when the payload field 900 carries more bits under the optimized scheme than under the non-optimized scheme.

$$N+K \times P > N \times K \quad (2\text{-}1)$$

In Equation 2-1, N is the total number of the antenna elements $A_0$-$A_{N-1}$. K is the number of bits required to represent beam-tracking status per antenna element $A_0$-$A_{N-1}$. P is the total number of antenna elements with a changed status. For example, where N=16, K=4, the payload field 900 carries more bits under the optimized scheme than under the non-optimized scheme if P is greater than 12 (see Equation 2-2 below).

$$16+4 \times P > 16 \times 4$$

$$P > 12 \quad (2\text{-}2)$$

To avoid carrying more bits than the non-optimized scheme, the optimized scheme can be opted for only in certain cases, depending on the total number of antenna elements with a changed status. In the above example of Equation 2-2, if the total number P of antenna elements with a changed status is 12 or less, it is as efficient as or more efficient to use the optimized scheme than the non-optimized scheme. When P is 12 or less, the optimized scheme requires N+K×P=16+4×P, which is 64 bits or less. The non-optimized scheme, however, always requires N×K=16×4=64 bits, regardless of the number of antenna elements with a changed status. Therefore, when P is 12 or less, the ACK frame 900 may be formed under the optimized scheme, and otherwise, under the non-optimized scheme.

Figure 10:
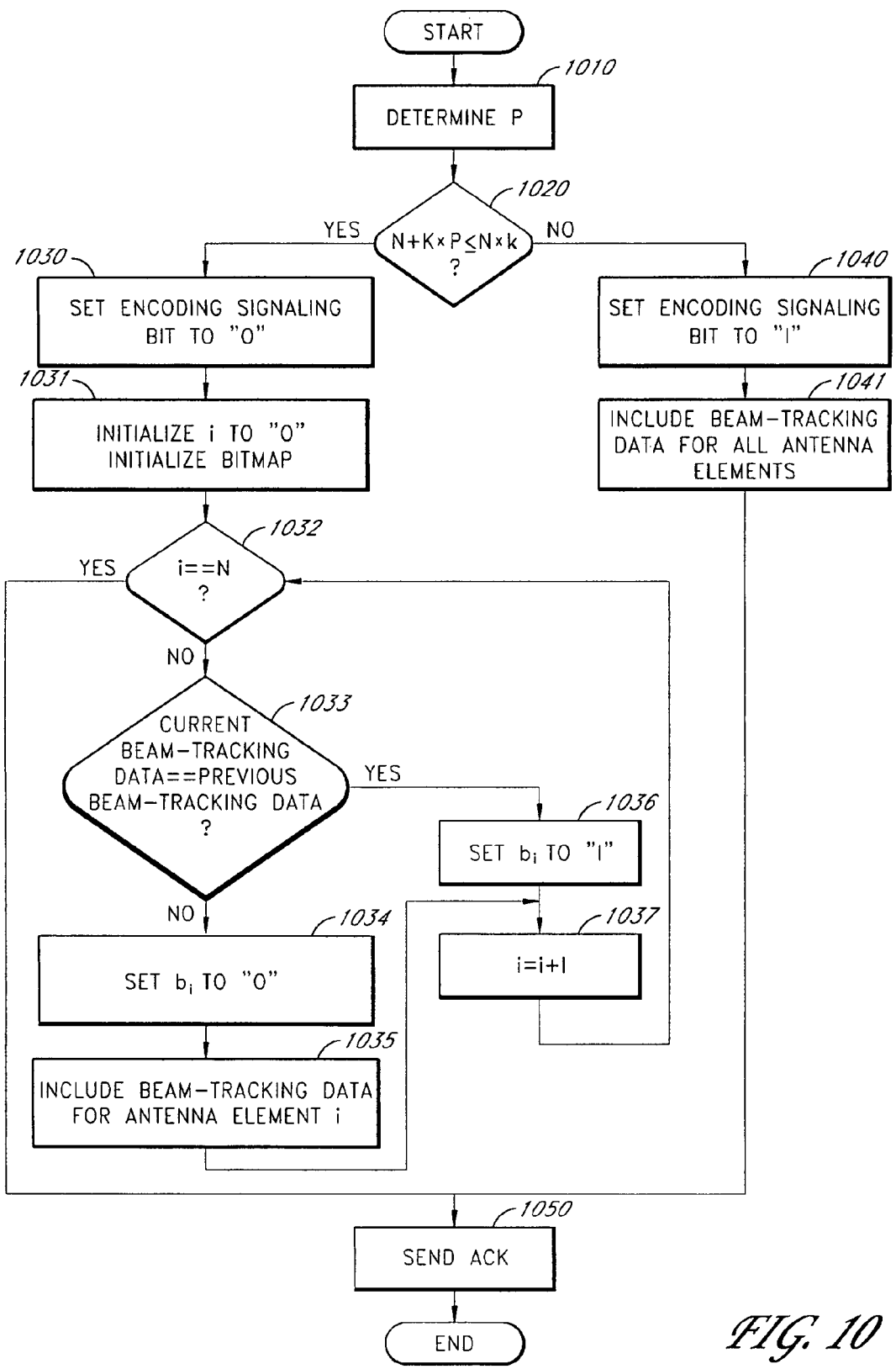
FIG. 10 is a flowchart illustrating a method of optimizing the payload field of FIG. 9, according to one embodiment.

FIG. 10 is a flowchart illustrating a method of optimizing the payload field of FIG. 9, according to one embodiment. In block 1010, the total number P of antenna elements with a changed status is determined. In this block, for each antenna element, the current beam-tracking data is compared with the immediately previous beam-tracking data.

In block 1020, it is determined whether the optimized or non-optimized scheme will be used. In the illustrated embodiment, whether P meets Equation 2-3 is determined.

$$N+K \times P \leq N \times K \quad (2\text{-}3)$$

If P satisfies Equation 2-3, the method proceeds to block 1030, and otherwise to block 1040. In block 1030, the encoding signaling bit is set to "0" which indicates that the optimized scheme is opted for. Then, in block 1031, "i" which indicates antenna element data being processed is set to "0." In addition, all the bits $b_0$-$b_{N-1}$ in the bitmap 920 of FIG. 9 are initialized.

Block 1032 determines whether data for all the antenna elements $A_0$ to $A_{N-1}$ (FIG. 8) has been processed. In the illustrated method, block 1032 determines whether i is N. As will be better understood from later description, i increases from 0 to N one by one at block 1037 as the method continues with the antenna elements from $A_0$ to $A_{N-1}$. Thus, N indicates that data for all the antenna elements $A_0$ to $A_{N-1}$ has been processed. If i is N at block 1032, the method proceeds to block 1050, in which the completed ACK signal is transmitted over the LR channel described above, and otherwise (i<N) to block 1033.

If i is less than N, data for the i-th antenna element $A_i$ is processed in block 1033. In block 1033, it is determined whether the current beam-tracking data is the same as the immediately previous beam-tracking data. In one embodiment, the determination may be made by performing an XOR operation on the current and previous beam-tracking data. It will be appreciated that various other methods can be adapted for the determination in block 1033.

If the answer is "NO" in block 1033, the method proceeds to block 1034. In block 1034, the i-th bit $b_i$ in the bitmap 920 (FIG. 9) for the i-th antenna element $A_i$ is set to "0." Then, in block 1035, the current beam-tracking data of the i-th antenna element $A_i$ is added to the beam-tracking data field 930 of FIG. 9.

Next, in block 1037, i increases by 1, thereby indicating that data for the next antenna element $A_{i+1}$ will now be processed. The method then returns to block 1032 for the next antenna element $A_{i+1}$, and determines whether data for all the antenna elements $A_0$ to $A_{N-1}$ has been processed.

Returning back to block 1033, if the answer is "YES," the method proceeds to block 1036. In block 1036, the bit $b_i$ in the bitmap 920 for the i-th antenna element $A_i$ is set to "1." No beam-tracking data is added to the beam-tracking data field 930 of FIG. 9 for the i-th antenna element $A_i$. Then, the method proceeds to block 1037, where i increases by 1. Then, the blocks 1032-1037 are repeated until data for all the antenna elements $A_0$-$A_{N-1}$ are processed.

After all the antenna element data is processed, the method proceeds to block 1050. In block 1050, an ACK signal including the encoding signaling bit 910, the bitmap 920, and the beam-tracking data field 930 is transmitted over the channel as described above. In this case, the beam-tracking data field 930 includes data only for the antenna elements with a changed status.

Returning to block 1020, if P does not satisfy Equation 2-3, the method proceeds to block 1040. In block 1040, the encoding signaling bit is set to "1" which indicates that the non-optimized scheme is used. Then, in block 1041, all the current beam-tracking data of all the antenna elements $A_0$-$A_{N-1}$ is added to the ACK signal without the bitmap 920. Then, the method proceeds to block 1050 in which the ACK signal is transmitted over the LR channel.

In the embodiments described above, the ACK signals can have a reduced size, and thus provide more time for the use of the HR channel. Thus, the wireless system can make an efficient use of wireless channels while enhancing the accuracy and quality of uncompressed video data being transferred.

The foregoing description is that of embodiments of the invention and various changes, modifications, combinations and sub-combinations may be made without departing from the spirit and scope of the invention, as defined by the appended claims.

What is claimed is:

1. A wireless communication device for uncompressed video data, comprising:
   a receiver configured to receive a data packet during a reserved time slot or contention-free data period; and
   a transmitter configured to send an acknowledgment (ACK) frame during the slot or period via a low-rate channel upon receiving the data packet, the low-rate channel having a directional mode and an omni-directional mode, the ACK frame comprising:
     a physical layer preamble;
     a physical layer header including a plurality of bits indicative of the status of the data packet, and
     a payload field comprising:
       a bitmap including a plurality of bits, each bit being assigned to a respective one of antenna elements, and being indicative of whether the current status of the respective one of the antenna elements is different from the immediately previous status thereof; and
     a cyclic redundancy check (CRC) field,
     wherein the ACK frame includes neither information indicative of a source address nor information indicative of a destination address, and
     wherein the ACK frame does not include a media access control (MAC) header.

2. The device of claim 1, wherein the receiver is configured to receive the data via a low-rate channel.

3. The device of claim 2, wherein the low-rate channel is in one of a directional mode and an omni-directional mode.

4. The device of claim 1, wherein the receiver is configured to receive the data packet via a high-rate channel, and wherein the transmitter is configured to send the ACK frame via a low-rate channel.

5. The device of claim 1, wherein the plurality of bits of the physical layer header comprise at least one bit indicative of whether bits in the data packet are equally or unequally protected against transmission error.

6. The device of claim 5, wherein the plurality of bits of the physical layer header further comprise one or more bits indicative of the status of the data packet.

7. The device of claim 6, wherein the transmitter is configured to select what the one or more bits of the physical layer header are indicative of, depending on whether the bits in the data packet are equally or unequally protected against transmission error.

8. The device of claim 7, wherein the data packet comprises a plurality of data sub-packets, and wherein the one or more bits of the physical layer header are indicative of the most significant bits of the data sub-packets.

9. The device of claim 8, wherein the one or more bits of the physical layer header are further indicative of the least significant bits of the data sub-packets.

10. The device of claim 7, wherein the transmitter is configured to use one of a directional mode and an omni-directional mode when sending the ACK frame, and wherein the transmitter is further configured to select what the one or more bits of the physical layer header are indicative of, depending on whether the transmitter uses the directional mode or the omni-directional mode.

11. The device of claim 1, wherein the transmitter is configured to use a beam for transmitting the ACK frame, and wherein the payload field comprises data indicative of the status of the beam.

12. The device of claim 1, wherein the plurality of bits of the physical layer header further comprise at least one bit indicative of the content of the payload field.

13. The device of claim 1, wherein the device is configured to use time division duplexing (TDD).

14. The device of claim 1, wherein the device is configured to use frequency division duplexing (FDD).

15. An audiovisual device, comprising:
    the device of claim 1; and
    electronics configured to process audiovisual data.

16. A wireless communication device for uncompressed video data, comprising:
    means for receiving a data packet during a reserved time slot or contention-free data period; and
    means for sending an acknowledgment (ACK) frame during the time slot or period via a low-rate channel after receiving the data packet, the low-rate channel having a directional mode and an omni-directional mode, the ACK frame comprising:
      a physical layer preamble;
      a physical layer header including a plurality of bits indicative of the status of the data packet;
      a payload field comprising:
        a bitmap including a plurality of bits, each bit being assigned to a respective one of antenna elements, and being indicative of whether the current status of the respective one of the antenna elements is different from the immediately previous status thereof; and
      a cyclic redundancy check (CRC) field,
      wherein the ACK frame includes neither information indicative of a source address nor information indicative of a destination address, and
      wherein the ACK frame does not include a media access control (MAC) header.

17. A method of wireless communication for uncompressed video data, the method comprising:
    receiving, by a receiver, a data packet during a reserved time slot or contention-free data period; and
    sending, by a transmitter, an acknowledgment (ACK) frame during the slot or period via a low-rate channel after receiving the data packet, the low-rate channel having a directional mode and an omni-directional mode, the ACK frame comprising:

a physical layer preamble;
a physical layer header including a plurality of bits indicative of the status of the data packet;
a payload field comprising:
  a bitmap including a plurality of bits, each bit being assigned to a respective one of antenna elements, and being indicative of whether the current status of the respective one of the antenna elements is different from the immediately previous status thereof; and
a cyclic redundancy check (CRC) field,
wherein the ACK frame includes neither information indicative of a source address nor information indicative of a destination address, and
wherein the ACK frame does not include a media access control (MAC) header.

18. The method of claim 17, wherein receiving the data packet comprises using a high-rate channel, and wherein sending the ACK frame comprises using a low-rate channel.

19. The method of claim 17, wherein receiving the data packet comprises using a low-rate channel, and wherein sending the ACK frame comprises using the low-rate channel.

20. The method of claim 19, wherein the low-rate channel is in a directional mode, and wherein the ACK frame is sent via the low-rate channel.

21. The method of claim 19, wherein the low-rate channel is in an omni-directional mode, and wherein the ACK frame is sent via the low-rate channel.

22. The method of claim 17, wherein the plurality of bits of the physical layer header comprise at least one bit indicative of whether bits in the data packet are equally or unequally protected against transmission error.

23. The method of claim 22, wherein the plurality of bits of the physical layer header further comprise one or more bits indicative of the status of the data packet.

24. The method of claim 23, wherein sending the ACK frame comprises selecting what the one or more bits of the physical layer header are indicative of, depending on whether the bits in the data packet are equally or unequally protected against transmission error.

25. The method of claim 24, wherein sending the ACK frame comprises using one of a directional mode and an omni-directional mode, and wherein sending the ACK frame comprises selecting what the one or more bits of the physical layer header are indicative of, depending on whether the directional mode or the omni-directional mode is used.

26. The method of claim 17, wherein the payload field comprises beam-tracking data.

27. The method of claim 17, wherein the plurality of bits of the physical layer header further comprise at least one bit indicative of the content of the payload field.

28. A wireless communication device for uncompressed video data, comprising:
a receiver configured to receive a data packet;
an array of multiple antenna elements, the output of the array being controlled such that radiated power is enhanced in some directions and reduced in other directions for beam-forming; and
a transmitter configured to send an acknowledgment (ACK) frame comprising a payload field upon receiving the data packet, wherein the transmitter is further configured to determine the total number of the antenna elements whose current status is different from the immediately previous status thereof, and to selectively include a bitmap in the payload field, based on the total number, the payload field comprising:
  the bitmap, wherein the bitmap including a plurality of bits, each bit being assigned to a respective one of the antenna elements, and being indicative of whether the current status of the respective one of the antenna elements is different from the immediately previous status thereof; and
  a data field including data indicative of the current status of the antenna elements whose current status is different from the immediately previous status thereof.

29. The device of claim 28, wherein the data of the data field comprises the beam-tracking data of the antenna elements.

30. A wireless communication device for uncompressed video data, comprising:
an array of multiple antenna elements, the output of the array being controlled such that radiated power is enhanced in some directions and reduced in other directions for forming a beam;
means for receiving a data packet via the array; and
means for sending an acknowledgment (ACK) frame via the array upon receiving the data packet, the ACK frame comprising a payload field comprising:
  a bitmap including a plurality of bits, each bit being assigned to a respective one of the antenna elements, and being indicative of whether the current status of the respective one of the antenna elements is different from the immediately previous status thereof
  a data field including data indicative of the current status of the antenna elements whose current status is different from the immediately previous status thereof.

31. A method of wireless communication for uncompressed video data, the method comprising:
forming a beam using an array of multiple antenna elements, the output of the array being controlled such that radiated power is enhanced in some directions and reduced in other directions to form the beam;
receiving a data packet via the array;
providing an acknowledgment (ACK) frame having a payload field, providing the ACK frame comprising:
  selectively adding data comprising a bitmap to the payload field, the bitmap including a plurality of bits, each bit being assigned to a respective one of the antenna elements, and being indicative of whether the current status of the respective one of the antenna elements is different from the immediately previous status thereof, and wherein the bitmap is selectively added to the payload field, based on the total number, and
sending the ACK frame via the array.

32. The method of claim 31, wherein the data added to the payload field comprises the beam-tracking data of the antenna elements.

* * * * *